Jan. 8, 1963  B. VON BUCHHOLTZ ETAL  3,072,166
CARRYING CASE FOR PHOTOGRAPHIC CAMERAS
Filed Sept. 9, 1959  2 Sheets-Sheet 1
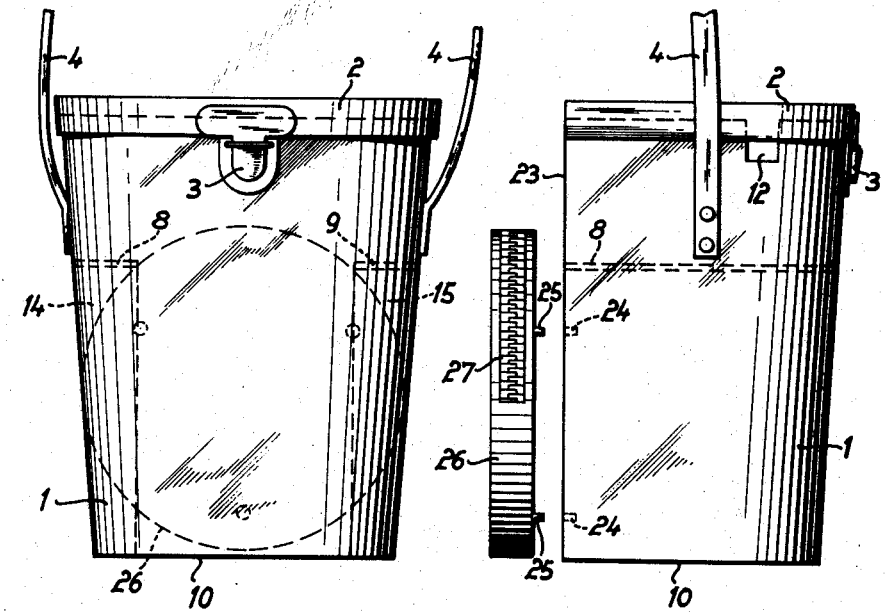
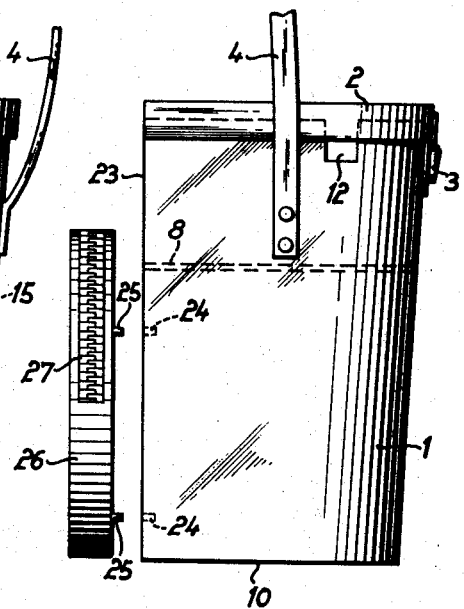
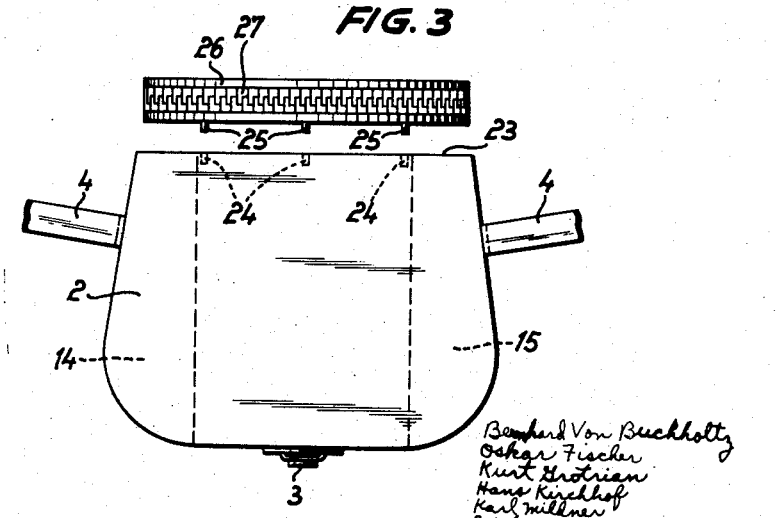
INVENTORS
Bernhard Von Buchholtz
Oskar Fischer
Kurt Grotrian
Hans Kirchhof
Karl Mildner
Erich Mann
By Blum, Moscovitz, Friedman & Blum
Attorneys INVENTORS
Bernhard Von Buchholtz
Oskar Fischer
Kurt Grotrian
Hans Kirchhof
Karl Mildner
Erich Mann By Blum, Moscovitz, Friedman &
Blum
Attorneys

3,072,166
CARRYING CASE FOR PHOTOGRAPHIC CAMERAS
Bernhard von Buchholtz, Braunschweig, Oskar Fischer, Volkmarode, Kurt Grotrian, Konigslutter, Hans Kirchhof and Karl Mildner, Braunschweig, and Erich Mann, Wolfsburg, Germany, assignors to Voigtlander A.G., Braunschweig, Germany, a corporation of Germany
Filed Sept. 9, 1959, Ser. No. 838,956
Claims priority, application Germany Apr. 21, 1959
1 Claim. (Cl. 150—52)

This invention relates to carrying cases and it has particular relation to carrying cases to photographic cameras having an objective projecting from the camera body.

Such carrying cases are used for keeping photographic cameras and accessory parts. The camera must be removed from the case for picture taking.

It has been known to keep photographic cameras in a cover which encloses the camera body and is provided with a carrying strap or chain. After removal of the camera from the carrying case or cover, the camera can be carried by means of the strap or chain fastened to such cover so that, in addition to the slung carrying case, the operator also has the camera available for picture taking.

In a known type of prior art carrying case, the case is provided not only with a hinged cover but also with hinged walls which may be partially or completely opened to expose the camera. In this type of carrying case, the camera is fixed in a separate holding means from which it must be removed, after opening of the cover and side walls of the carrying case, before the camera can be slung. With this type of carrying case, therefore, a number of steps must be taken before the camera is ready for picture taking.

The main object of the present invention is to limit such manipulations to a minimum and to simplify them by a novel structure of the carrying case. For an understanding of the principles of the invention, reference is made to the following description of a typical embodiment thereof as illustrated in the accompanying drawings.

According to the present invention, the camera is kept and supported in the case with its objective suspended in downward direction. Thus, the camera kept in the case has its axis of the picture taking objective normal to the bottom surface of the case. This has particular advantages if the camera has a picture taking objective of large over-all length, e.g. an objective of variable focal length. If such a camera is carried by means of a strap or chain fastened to the camera body, the camera has a tendency to assume a position in which the axis of the objective extends downwardly. Thus, the arrangement of the camera in the carrying case corresponds to this natural position of the camera, so that, upon inserting the camera in the case, the position of the camera does not have to be changed. Furthermore, after removal from the case, the camera is at once in its natural position.

The camera inserted in the carrying case according to the invention can be supported at the front surface of the objective mount by a preferably elastic seat member arranged on the bottom of the camera. Or, the case may be provided with bracket-like seat member or supports for the front wall of the camera casing, which are arranged spaced from the camera cover at a distance approximately corresponding to the thickness of the camera and extend in horizontal direction. Of course, by a suitable selection of the distance of these members or supports from each other, the camera can be simultaneously supported at the front surface of its objective and the front wall of the camera body.

According to a further embodiment of the invention, the bracket-like seat members are supported from below. This can be done by walls arranged perpendicularly to the bottom of the carrying case. These walls can be at the same time outer walls of the carrying case so that the latter has an approximately T-shaped design in front view.

However, it is also possible to form the outer walls of the carrying case rectilinearly. Such outer walls may extend from the greatest width of the inserted camera perpendicularly or inclined relative to the bottom surface of the carrying case, whereby these outer walls, and the supporting walls provided for the bracket-like supports, enclose storage spaces for accessories of the camera and the objective. The bracket-like supports may be at the same time folding covers for such storage spaces.

It is of advantage to provide recesses in the carrying case, through which an additional carrying strap, or the like, connected with the camera, can be passed from the closed carrying case. The operator can then sling the conventional strap fastened to the carrying case and also the carrying strap or chain fastened to the camera. After removal of the camera from the carrying case, the case and the camera are separately suspended without the necessity of any further step. The strap connected with the camera can be fastened directly to the camera body. However, this strap can be also fastened to a cover which partially encloses the camera body and is fixedly connected with the camera, e.g. by means of a tripod screw.

It is also of advantage to arrange elastic shims on the inner surface of the carrying case cover. In the closed position of the cover, these shims engage the rear wall of the camera, whereby the camera is elastically fixed between the cover and its supporting surfaces on the objective or on the front wall of the camera body.

Furthermore, the outer surface of the carrying case can be provided with fastening means, e.g. with snaps for an accessory case to be fastened to the carrying case. In such an accessory case, accessory parts, such as a foldable sun shield, for which there is no space in the carrying case, can be housed.

In the appended drawings

FIG. 1 illustrates the closed carrying case in front elevation view;

FIG. 2 shows the carrying case in side elevation view;

FIG. 3 is a top plan view of the closed carrying case;

Figure 4:
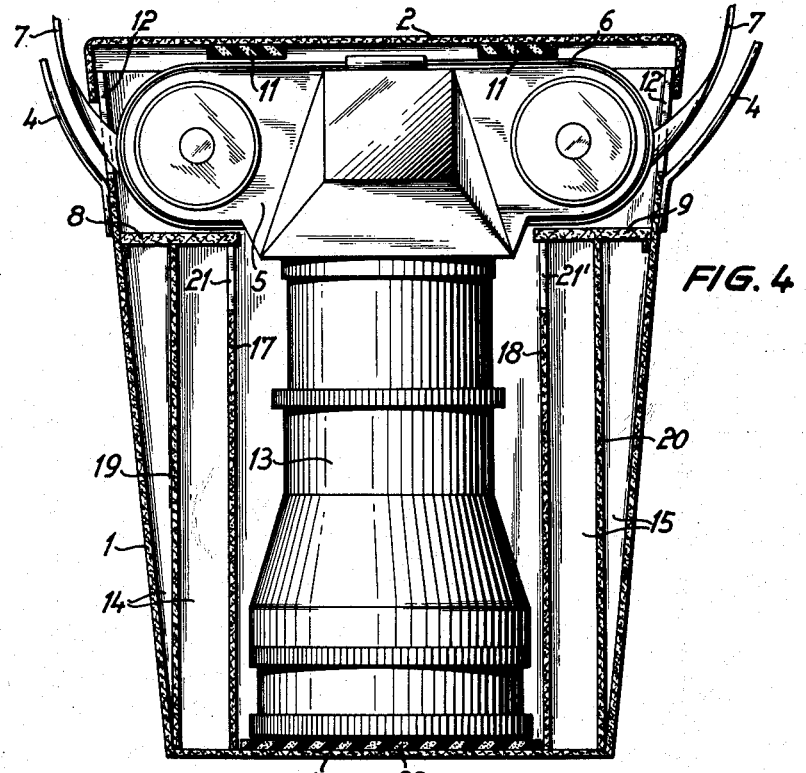
FIG. 4 is a vertical sectional view of the carrying case on an enlarged scale in comparison with FIGS. 1–3.

Referring now to the drawings in detail, the body of the carrying case is denoted 1 and the foldable cover is denoted 2. This cover 2 is held in closed position on body 1 by a lock 3. A carrying strap 4 is fastened to body 1.

Figure 5:
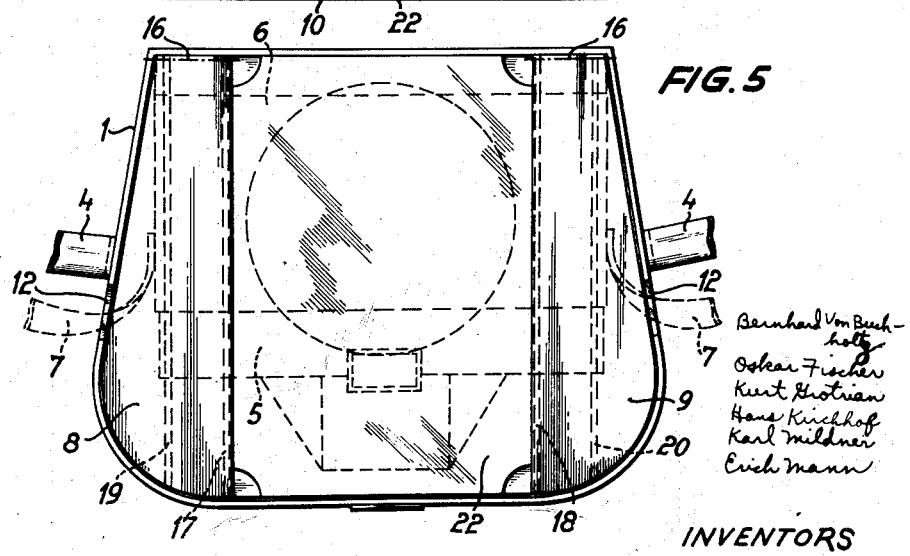
FIG. 5 is a top plan view of the open carrying case.

As can be best seen in FIGS. 4 and 5, the carrying case forms a container for the photographic camera 5, which is fixed in conventional manner in a casing 6 to which a carrying strap 7 is fastened. In the body 1 of the carrying case, two partitions 8 and 9 are arranged, which extend about parallel to the bottom surface 10 of body 1. Partitions 8 and 9 form supports for the camera 5 placed in the carrying case 1, 2 and the camera 5 lies with the front wall of the camera casing, or with the casing 6 covering said wall, against partitions 8 and 9. Two shim members 11 (see FIG. 4) of elastic material lie—when cover 2 is in closed position—against the rear wall of the camera casing, or against the parts of case 6 which cover said wall, so that the camera is in elastically fixed position between cover 2 and partitions 8 and 9.

It can be also seen from FIGS. 4 and 5, that the additional carrying strap 7 fastened to the case 6 is passed from body 1 through recesses 12 (see also FIG. 2) which are provided in the side walls of body 1. As can be best seen in FIG. 2, the recesses 12 open through the upper edges of the side walls so that carrying strap 7 can be easily and conveniently passed through them. The operator can thus suspended the camera by both carrying straps 4 and 7. Strap 4, which is fastened to carrying case 1, is preferably somewhat shorter than strap 7 so that it carries the carrying case 1, 2 and the camera 5 inserted therein. After opening cover 2, the camera 5 can be easily and quickly removed from carrying case 1, 2 by means of strap 7. As the operator has then already slung strap 7, the camera will be, after proper orientation, ready for picture taking. The camera 5 and the carrying case 1, 2 can now be carried separately on straps 7 and 4, respectively.

It can be seen from FIG. 4 that the objective 13 inserted in camera 5 has a large overall length. It may be a teleobjective or an objective having adjustable focal length. Therefore, the camera 5 provided with this objective 13 has the tendency to point with its optical axis in downward direction when suspended on strap 7 only. The arrangement of the camera in carrying case 1, 2, corresponds to this tendency.

The partitions 8 and 9 are not rigidly fastened in body 1 and they form hinged covers for two containers 14 and 15, which extend on both sides of the objective 13 and serve for keeping accessory parts, e.g. filters, front lens attachments and any desired other parts. The axis, about which the partitions 8 and 9 can be swung, is indicated in FIG. 5 by a dot-dash line 16. These containers 14 and 15 are separated from the inner space of body 1 by walls 17 and 18 and they are subdivided by partitions 19, 20. Openings 21, 21' provided in walls 17 and 18 facilitate access to accessory parts placed in containers 14 and 15.

By means of walls 17, 18, 19 and 20, partitions 8 and 9, which form supports for the camera 5, are braced against the bottom of the carrying case.

On the inner side of bottom wall 10, an elastic cushion 22 is placed, against which the front surface of objective mount 13 may lie, so that the camera can have a resiliently cushioned support in carrying case 1 also at this place.

As shown in FIGS. 1–3, in the rear wall 23 of body 1, parts 24 of snap means are provided in which an accessory case 26 can be fastened by means of snap buttons 25. This case 26, which can be closed by a slide-fastener 27, serves, for example, for housing a foldable sun shield. If desired, accessory case 26 can be fixedly connected to the carrying case and the snap means 24, 25 can then be omitted.

While it can be seen from FIGS. 1 and 4 that the side walls of body 1 converge from cover 2 toward bottom 10, FIGS. 3 and 5 clearly show the trapezoidal outline of the case, in which the shorter of the two sides, i.e. side 23 (FIG. 3) has a length which approximately corresponds to the overall width of camera 5 and the transition to the parallel side and the two converging sides has a rounded design.

It will be understood from the above that this invention is not limited to the specific parts, elements, designs and other details specifically described above and illustrated in the drawings and can be carried out with various modifications without departing from the scope of the invention as defined in the appended claim.

What is claimed is:

A carrying case, for photographic cameras having relatively elongated objectives extending from a front wall thereof, and arranged to support a camera with the objective thereof pointed downwardly when the carrying case is suspended from a carrying strap or the like, said carrying case comprising a bottom wall, side walls extending upwardly from the bottom wall, and a top wall designed as a hinged lid; a first carrying strap for suspending said case, said strap having opposite ends secured to opposed points on the upper portions of said side walls so as normally to extend substantially perpendicular to said bottom wall; means forming a pair of supporting partitions extending in opposed relation from the side walls substantially parallel to said bottom wall with their inner ends in spaced relation and with their upper surfaces spaced from said bottom wall by a distance such that, when the front wall of the camera, from which an objective projects, rests on said upper surfaces with the objective extending downwardly between the facing inner ends of said supporting partitions, the outer end of the objective will substantially engage said bottom wall and the front wall of the camera will engage said supporting partitions; a casing for enclosing a camera exclusive of the objective; and a second carrying strap for suspending said casing, said second carrying strap having opposite ends secured to opposed points on said casing adjacent said opposed points on said side walls; said second carrying strap extending through opposed upwardly opening recesses in said side walls to extend substantially parallel to said first carrying strap, whereby both carrying straps may be swung over at the same time; whereby, when said hinged lid top wall is opened, said second strap may be pulled free from said recesses and said casing may be withdrawn upwardly from said carrying case.

References Cited in the file of this patent

UNITED STATES PATENTS

| | | |
|---|---|---|
| 1,415,776 | Bourne | May 9, 1922 |
| 1,925,694 | Hawkins | Sept. 5, 1933 |
| 2,290,307 | Wicker | July 21, 1942 |
| 2,298,144 | McNabb | Oct. 6, 1942 |
| 2,478,267 | Hickler | Aug. 9, 1949 |
| 2,691,401 | Kontoff | Oct. 12, 1954 |

FOREIGN PATENTS

| | | |
|---|---|---|
| 812,150 | Germany | Aug. 27, 1951 |